United States Patent [19]
Naka et al.

[11] Patent Number: 6,002,472
[45] Date of Patent: Dec. 14, 1999

[54] METHOD OF MEASURING OPTICAL FIBER DRAWING TENSION

[75] Inventors: Yusuhiro Naka; Shimpei Todo, both of Tokyo, Japan

[73] Assignee: The Furukawa Electric Co., Ltd., Tokyo, Japan

[21] Appl. No.: 09/038,985

[22] Filed: Mar. 12, 1998

[30] Foreign Application Priority Data

Mar. 18, 1997 [JP] Japan ..................... 9-064616

[51] Int. Cl.$^6$ ................................. G01N 21/00
[52] U.S. Cl. ..................... 356/73.1; 250/559.24; 65/381
[58] Field of Search ............... 356/73.1; 250/559.24, 250/559.29; 65/381, 382, 384, 486; 73/160, 862.41; 364/469.01

[56] References Cited

U.S. PATENT DOCUMENTS

| | | | |
|---|---|---|---|
| 4,692,615 | 9/1987 | Mensah et al. | 73/160 |
| 5,079,433 | 1/1992 | Smith | 356/73.1 |
| 5,316,562 | 5/1994 | Smithgall et al. | 65/3.11 |
| 5,710,432 | 1/1998 | Bell | 356/73.1 |

*Primary Examiner*—Frank G. Font
*Assistant Examiner*—Tu T. Nguyen
*Attorney, Agent, or Firm*—Jacobson, Price, Holman & Stern, PLLC

[57] ABSTRACT

A method of measuring the tension of drawing an optical fiber by means of the oscillation waveform of the optical fiber being drawn according to the invention can accurately, reliably and easily detect a peak frequency in the frequency spectrum of an oscillation waveform without being affected by noise. With the method of measuring the tension of an optical fiber being drawn by determining the fundamental oscillation frequency of the optical fiber from a peak in the spectrum of the linear oscillation waveform of the optical fiber, the detection of a peak frequency in the frequency spectrum of a linear oscillation waveform comprises steps of conducting an initial detecting operation over a frequency range expected to contain a peak frequency and conducting subsequent detecting operations over respective frequency ranges obtained by sequentially aligning the median frequency with the peak frequency detected in the immediately preceding detecting operation.

5 Claims, 5 Drawing Sheets

BANDPASS FILTER SIDE (WHEN y(i) i=1~m ARE TAKEN IN WITH DIGITAL TYPE FILTER)

$$y(i)=\sum_{j=0}^{k} h(j)\, y(i-j),\ h(n)=\frac{1}{-n}\sin(W_L n)\, 2\cos(W_H n)$$

1-m : NUMBER OF DATA
n : DEGREE OF FILTER
$W_L$: LOWER SIDE CUT OFF FREQUENCY
$W_H$: HIGHER SIDE CUT OFF FREQUENCY

SAMPLING FREQUENCY: 50Hz
n=6  $W_L$: CORRESPONDING TO 50Hz
     $W_H$: CORRESPONDING TO 11Hz

METHOD OF MEASURING OPTICAL FIBER DRAWING TENSION

BACKGROUND OF THE INVENTION

This invention generally relates to the technology of manufacturing optical fibers and, more particularly, it relates to an improved method of accurately and reliably measuring the tension of an optical fiber when it is being drawn.

With a typical known method of manufacturing optical fibers, the source material is molten by heat and the molten material is pulled and thinned to form a line. The optical fiber obtained by such heating and pulling may be coated with an appropriate material such as resin forthwith. The operation of producing an optical fiber by heating and pulling a source material is referred to as drawing.

In the process of coating the surface of an optical fiber as it is drawn, the tension of the optical fiber is observed immediately before and after the coating in order to check if the fiber is coated properly or not. An optical fiber that shows drawing tension differently before and after the coating, it can more often than not become broken to give rise to a troubled manufacture line. If such an accident occurs, measures have to be taken to provide and maintain an appropriate level of optical fiber drawing tension before and after the coating process typically by changing the temperature of molten resin to be used for coating the optical fiber. The tension of drawing an optical fiber also affects the light transmitting performance of the produced optical fiber. For example, if an optical fiber is produced with an excessive level of tension and coated with strain remaining in the inside, the coated optical fiber will show a large transmission loss. Therefore, it is important to observe the optical fiber drawing tension and regulate the drawing tension according to the reading of the tension from the viewpoint of producing optical fibers with little transmission loss.

The use of the oscillation waveform of an optical fiber that is being drawn as means for measuring the tension of drawing the optical fiber is already well known. With this technique, the fundamental (natural) oscillation frequency f of the optical fiber is determined from the frequency spectrum of the observed oscillation waveform and the obtained value is used as substitute for f in equation $[T=(2 \cdot L \cdot f)^2 \cdot \rho \cdot \alpha]$ in order to determine the tension T being applied to the optical fiber, where L may represent the distance between the optical fiber source material and the coating die (first coating die) for forming a first coat layer on the optical fiber or the distance between the first coating die and the second coating die for forming a second coat layer, n represent the linear density and a represent a correction factor.

FIGS. 4A and 4B of the accompanying drawing illustrate the spectrums of respective oscillation waveforms that were actually obtained at an optical fiber manufacture line. Of these, FIG. 4A shows the frequency spectrum of an oscillation waveform with a peak frequency of 5.664063 Hz observed when an optical fiber is moved with a line speed of 100 m/min., whereas FIG. 4B shows the frequency spectrum of an oscillation waveform with a peak frequency of 7.1289006 Hz observed when an optical fiber is moved with a line speed of 980 m/min.

It will be clear by comparing FIGS. 4A and 4B that the frequency spectrum of the oscillation waveform of an optical fiber obtained at an optical fiber manufacture line contains noise components in addition to the fundamental oscillation frequency and hence it is not possible to accurately determine and regulate the tension of drawing the optical fiber from such a frequency spectrum Thus, the net result of using the known technology of coating the surface of an optical fiber while it is being drawn will be an optical fiber manufacture line that cannot effectively avoid broken optical fibers nor provide optical fibers with little transmission loss.

In view of the above identified technological problem, it is therefore the object of the present invention to provide a method of measuring the tension of drawing an optical fiber by means of the oscillation waveform of the optical fiber being drawn that can accurately, reliably and easily detect a peak frequency in the frequency spectrum of an oscillation waveform without being affected by noise.

SUMMARY OF THE INVENTION

According to a first aspect of the invention, the above object is achieved by providing a method of measuring the tension of an optical fiber being drawn by determining the fundamental oscillation frequency of the optical fiber from a peak in the spectrum of the linear oscillation waveform of the optical fiber, characterized in that the detection of a peak frequency in the frequency spectrum of a linear oscillation waveform comprises steps of conducting an initial detecting operation over a frequency range expected to contain a peak frequency and conducting subsequent detecting operations over respective frequency ranges obtained by sequentially aligning the median frequency with the peak frequency detected in the immediately preceding detecting operation.

According to a second aspect of the invention, there is provided a method of measuring the tension of an optical fiber being drawn by determining the fundamental oscillation frequency of the optical fiber from a peak in the spectrum of the linear oscillation waveform of the optical fiber, characterized in that the detection of a peak frequency in the frequency spectrum of a linear oscillation waveform comprises steps of preliminarily selecting an expected peak frequency (a), selecting a value (b) for a peak shift expected to take place in each peak frequency detecting operation, conducting an initial detecting operation over a frequency range defined by (a−b) and (a+b) and conducting subsequent detecting operations over respective frequency ranges defined by (c−b) and (c+b), c being the peak frequency detected in the immediately preceding detecting operation.

Preferably, the detection of a peak frequency in the frequency spectrum of a linear oscillation waveform is conducted between the upper limit and the lower limit of a preselected and fixed peak frequency range.

Preferably, the linear oscillation waveform of the optical fiber is made to pass through a bandpass filter corresponding to the detection frequency range and the obtained waveform is transformed into a simple harmonic oscillation waveform data to detect the peak frequency of the spectrum from the obtained data.

Preferably, the detection of a peak frequency in the frequency spectrum of a linear oscillation waveform further comprises a step of determining the value of the fundamental oscillation frequency f of the optical fiber from the peak frequency in the frequency spectrum of the observed oscillation waveform and using the determined value as substitute for f in equation $[T=(2 \cdot L \cdot f)^2 \cdot \rho \cdot \alpha]$, where T is the tension being applied to the optical fiber, L is the distance between the optical fiber source material and the coating die for forming a first coat layer on the drawn optical fiber or the distance between the first coating die for forming a first coat and the second coating die for forming a second coat layer, n is the linear density and a is a correction factor.

With a method according to the first aspect of the invention, the detection of a peak frequency in the frequency spectrum of a linear oscillation waveform comprises steps of conducting an initial detecting operation over a frequency range expected to contain a peak frequency and conducting subsequent detecting operations over respective frequency ranges obtained by sequentially aligning the median frequency with the peak frequency detected in the immediately preceding detecting operation. With this arrangement, the frequency range over which the operation of detecting a peak frequency is conducted can be narrowed to eliminate the risk of mistaking a noise for a peak frequency and hence a peak frequency can be detected accurately, reliably and easily.

With a method according to the second aspect of the invention, the detection of a peak frequency in the frequency spectrum of a linear oscillation waveform comprises steps of preliminarily selecting an expected peak frequency (a), selecting a value (b) for a peak shift expected to take place in each peak frequency detecting operation, conducting an initial detecting operation over a frequency range defined by (a−b) and (a+b) and conducting subsequent detecting operations over respective frequency ranges defined by (c−b) and (c+b), c being the peak frequency detected in the immediately preceding detecting operation. With this arrangement, appropriate values are selected for a and b so that the frequency range over which the operation of detecting a peak frequency is conducted can be defined in terms of a and b according to the circumstances to eliminate the risk of mistaking a noise for a peak frequency and hence a peak frequency can be detected accurately, reliably and easily.

If the detection of a peak frequency in the frequency spectrum of a linear oscillation waveform is conducted between the upper limit and the lower limit of a preselected and fixed peak frequency range, then the operation of detecting a peak frequency can never miss the mark and become astray after shifting the frequency range for detecting a peak frequency because a peak frequency exists between the upper limit and the lower limit for certain.

If the linear oscillation waveform of the optical fiber is mace to pass through a bandpass filter corresponding to the detection frequency range and the obtained waveform is transformed into a simple harmonic oscillation waveform data to detect the peak frequency of the spectrum from the obtained data, then the oscillation frequency of the optical fiber can be computationally determined in a quick manner by simple means that will be as reliable as Fourier transformation.

If the detection of a peak frequency in the frequency spectrum of a linear oscillation waveform further comprises a step of determining the value of the fundamental oscillation frequency f of the optical fiber from the peak frequency in the frequency spectrum of the observed oscillation waveform and using the determined value as substitute for f in equation $[T=(2 \cdot L \cdot f)^2 \cdot \rho \cdot \alpha]$, which is already known, then the tension being applied to the optical fiber can be detected accurately, reliably and easily by combining the expression and the present invention.

DESCRIPTION OF THE BEST MODES OF CARRYING OUT THE INVENTION

Now, a method of measuring the tension of drawing an optical fiber according to the invention will be described in terms of a specific mode of carrying out the invention.

Figure 1:
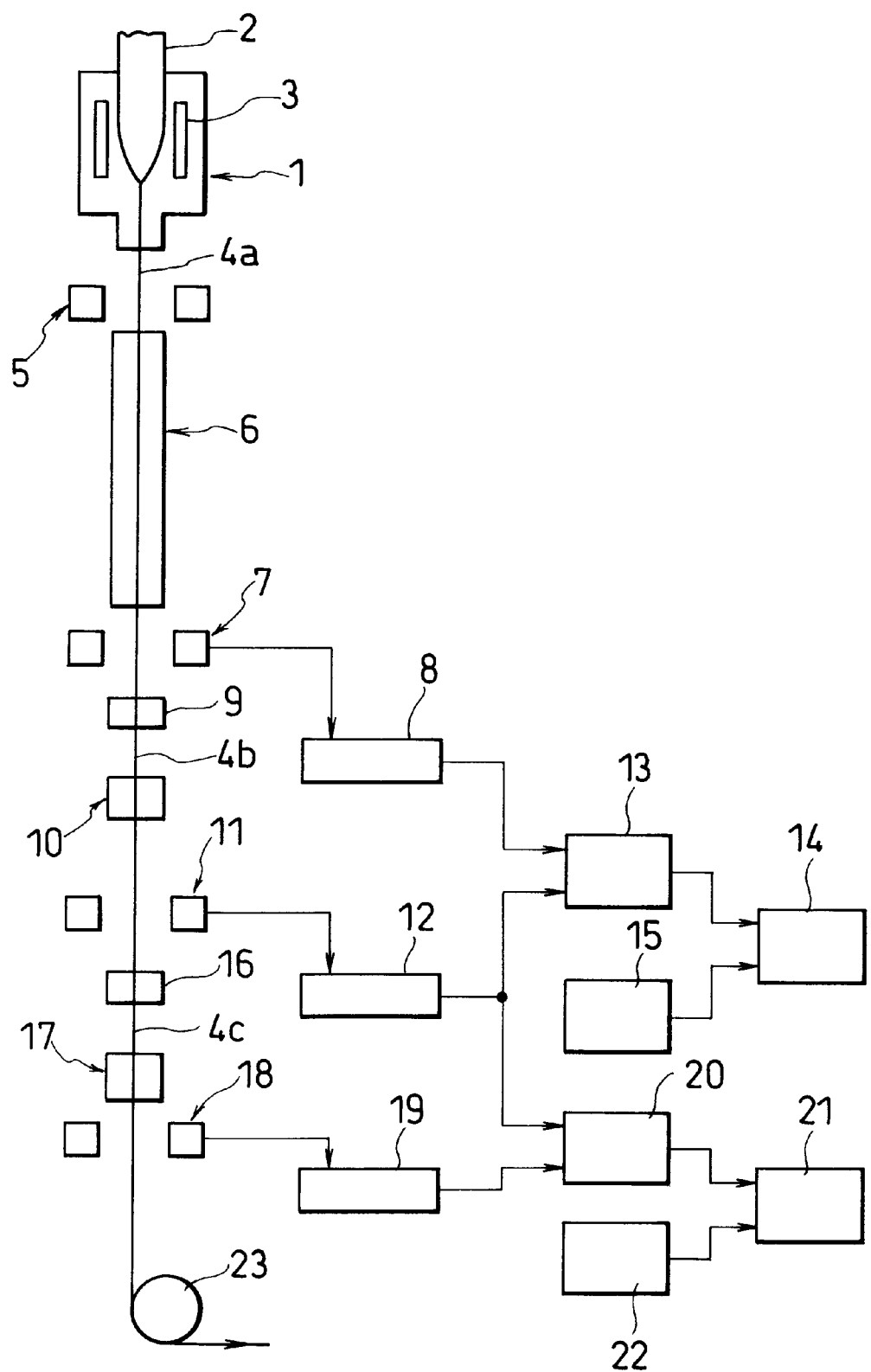
FIG. 1 is a schematic block diagram illustrating various instruments and other means to be used for a mode of carrying out the invention along with an optical fiber drawing system that can be used for the purpose of the invention.

FIG. 1 shows an optical fiber drawing system designed to continuously produce an optical fiber coated with a secondary coat 4c from an optical fiber source material 2 through the processing phases of supplying an optical fiber source material 2, drawing an optical fiber 4a, preparing an optical fiber coated with a primary coat 4b and producing an optical fiber coated with a secondary coat 4c. Referring to FIG. 1, there are shown a furnace 1 located upstream in the line and a turn sieve 23 arranged at the end of the line. Between the furnace 1 and the turn sieve 23, there are sequentially arranged an outer diameter gauge 5, a cooler 6, a first noncontact type oscillation sensor 7, a first coating die 9, a first coat hardener 10, a second noncontact type oscillation sensor 11, a second coating die 16, a second coat hardener 17 and a third noncontact type oscillation sensor 18.

The furnace 1 contains a cylindrical carbon heater 3. An optical fiber source material 2 which may typically be quartz glass is headed to melt from the bottom by the heater 3 arranged in the furnace 1 and drawn (from the bottom) to produce an optical fiber 4a. The outer diameter gauge 5 is ring-shaped and gauges the outer diameter of the optical fiber 4a immediately after coming out of the furnace 1 (and being drawn). After passing through the outer diameter gauge 5, the optical fiber 4a is cooled by the slender and cylindrical cooler 6. Then, the optical fiber 4a is made to pass through the first noncontact type oscillation sensor 7 which may be a laser displacement gauge, where the oscillation of the optical fiber 4a is electrically detected Then, the optical fiber 4a is coated on the outer peripheral surface with thermohardening or UV hardening resin for a primary coat as it passes through the first coating die 9, which primary coat is hardened by the first coat hardener 10 as the optical fiber coated with the primary coat 4b passes therethrough. It may be needless to say that the first coat hardener 10 is of a heating type when thermohardening resin is used for the primary coat, whereas it is of a UV-ray irradiation type when UV hardening resin is used for the primary coat. The second noncontact type oscillation sensor 11 electrically detects the oscillation of the optical fiber coated with the primary coat 4b passing therethrough, whereas the third noncontact type oscillation sensor 18 electrically detects the oscillation of the optical fiber (coated with the secondary coat 4c passing therethrough. Thus, they have a configuration substantially equal to that of the first sensor 7. Likewise, the second coating die 16 and the second cost hardener 17 are same as or similar to the coating die 9 and the coat hardener 10 respectively. After coming out of the third noncontact type sensor 18, the optical fiber coated with the secondary coat 4 is made to turn its direction and guided toward an optical fiber take-up unit by the turn sieve 23.

Referring to FIG. 1, the first and second noncontact type oscillation sensors 7 and 11, first and second tensiometers 8 and 12, a first tension difference calculator 13, a first discriminator 14 and a first reference value selector 15 constitute a gauging system. Of the devices, the first noncontact type oscillation sensor 7, the first tensiometer 8, the first tension difference calculator 13 and the first discriminator 14 are electrically connected in series, while the second noncontact type oscillation sensor 11, the second tensiometer 12, the first tension difference calculator 13 and the first discriminator 14 are also electrically connected in series. Additionally, the first reference value selector 15 is electrically connected to the first discriminator 14. On the other hand, the second and third noncontact type oscillation sensors 11 and 18, the second and third tensiometers 12 and 19, a second tension difference calculator 20, a second discriminator 21 and a second reference value selector 22 constitute another gauging system. Of the devices, the second noncontact type oscillation sensor 11, the second tensiometer 12, the second tension difference calculator 20 and the second discriminator 21 are electrically connected in series, while the third noncontact type oscillation sensor 18, the third tensiometer 19, the second tension difference calculator 20 and the second discriminator 21 are also electrically connected in series. Additionally, the second reference value selector 22 is electrically connected to the second discriminator 21.

Of the above devices, the first tensiometer 8 is used to determine the tension Ta1 being applied to the optical fiber 4a according to the signal fed from the first noncontact type oscillation sensor 7 and the second tensiometer 12 determines the tension Tb1 (=Ta2) being applied to the optical fiber coated with a primary coat 4b according to the signal fed from the second noncontact type oscillation sensor 11, whereas the third tensiometer 19 is used to determine the tension Tb2 being applied to the optical fiber coated with a secondary coat 4c according to the signal fed from the third noncontact type oscillation sensor 18. The first tension difference calculator 13 is used to calculate the difference (Tb1−Ta1) between the tension Ta1 determined by the first tensiometer 8 and the tension Tb1 determined by the second tensiometer 12 and the second tension difference calculator 20 is used to calculate the difference (Tb2−Ta2) between the tension Ta2 (=Tb1) determined by the second tensiometer 12 and the tension Tb2 determined by the third tensiometer 19. The first reference value selector 15 is used to provide a reference value to be compared with the tension difference (Tb1−Ta1) and the second reference value selector 22 is used to provide a reference value to be compared with the tension difference (Tb2−Ta2). The first discriminator 14 compares the tension difference (Tb1−Ta1) provided by the first tension difference calculator 13 with the reference value provided by the first reference value selector 15 and determines if the coating of the optical fiber coated with a primary coat 4b is acceptable or not. Likewise, the second discriminator 21 compares the tension difference (Tb2−Ta2) provided by the second tension difference calculator 20 and the second reference value provided by the second reference value selector 22 and determines if the coating of the optical fiber coated with a secondary coat 4c is acceptable or not.

In the arrangement of FIG. 1, the first through third tensiometers 8, 12 and 19, the first and second tension difference calculators 13 and 20, the first and second discriminators 14 and 21 and the first and second reference value selectors 15 and 22 may typically comprise microcomputers.

Now, the operation of continuously manufacturing a finished optical fiber from an optical fiber source material 2 will be described by referring to FIG. 1. As described above, the operation goes through the phases of preparing an optical fiber 4a, preparing an optical fiber coated with a primary coat 4b and preparing an optical fiber coated with a secondary coat 4c by means of the optical fiber drawing system of FIG. 1.

The optical fiber source material 2 is Led into the furnace 1 at a low and constant rate, where it is heated to melt from the bottom and drawn rapidly to produce a very fine optical fiber 4a. The optical fiber 4a is observed for the outer diameter by the outer diameter gauge 5 immediately after coming out of the furnace I and then cooled in the cooler 6. After passing through the cooler 6, the optical fiber 4a is observed for its oscillation by the first noncontact type oscillation sensor 7 an(d then coated with a primary coat of resin by the first coating die 9 to become an optical fiber coated with a primary coat 4b, whose primary coat layer is then hardened by the first coat hardener 10. After passing through the coat hardener 10, the optical fiber coated with the primary coat 4b is again observed for its scillation by the second noncontact type oscillation sensor 11 and then coated with a secondary coat of resin by the second coating die 16 to become an optical fiber coated with a secondary coat 4c, whose secondary coat layer is then hardened by the second coat hardener 17. After passing through the second coat hardener 17, the optical fiber coated with the secondary coat 4c is once again observed for its oscillation by the third noncontact type oscillation sensor 18 before taken up by an optical fiber Take-up unit (not shown) by way of the turn sieve 23.

With the mode of carrying out the invention as described above by referring to FIG. 1, the first through noncontact type oscillation sensors 7, 11 and 18 detect the oscillation of the optical fiber 4a, that of the optical fiber coated with the primary coat 4b and that of the optical fiber coated with the secondary coat 4c, respectively. The first tensiometer 8 determines the tension Ta1 being applied to the optical fiber 4a on the basis of the oscillation detection signal fed from the first noncontact type oscillation sensor 7. The second tensiometer 12 determines the tension Tb1 (−Ta2) being applied to the optical fiber coated with the primary coat 4b on the basis of the oscillation detection signal fed from the second noncontact type oscillation sensor 11. The third tensiometer 19 determines the tension Tb2 being applied to the optical fiber coated with the secondary coat 4c on the basis of the oscillation detection signal fed from the third noncontact type oscillation sensor 18. On the other hand, upon receiving the two tension values Ta1 and Tb1 from the first and second tensiometers 8 and 12, the first tension difference calculator 18 determines the tension difference (Tb1−Ta1) and feeds the first discriminator 14 with the obtained difference. Likewise, upon receiving the two tension values Ta2 and Tb2 from the second and third tensiometers 12 and 19, the second tension difference calculator 20 determines the tension difference (Tb2−Ta2) and feeds the second discriminator 21 with the obtained difference. Of the first and second discriminators 14 and 21, the first discriminator 14 receives a reference value from the first reference value selector 15 and the second discriminator 21 receives a reference value from the second reference value selector 22. Thus, the first discriminator 14 compares the reference value sent from the first reference value selector 15 and the actually observed tension difference (Tb1–Ta1) and determines if the coating of the optical fiber coated with the primary coat 4a is acceptable or not and the second discriminator 21 compares the reference value sent from the second reference value selector 22 and the actually observed tension difference (Tb2–Ta2) and determines if the coating of the optical fiber coated with the secondary coat 4b is acceptable or not. If either or both of the optical fiber coated with the primary coat 4b and the optical fiber coated with the secondary coat 4c are found to be defective and hence not acceptable, their respective coating conditions will be altered or modified to prevent the risk of any unexpected trouble from occurring.

Figure 2:
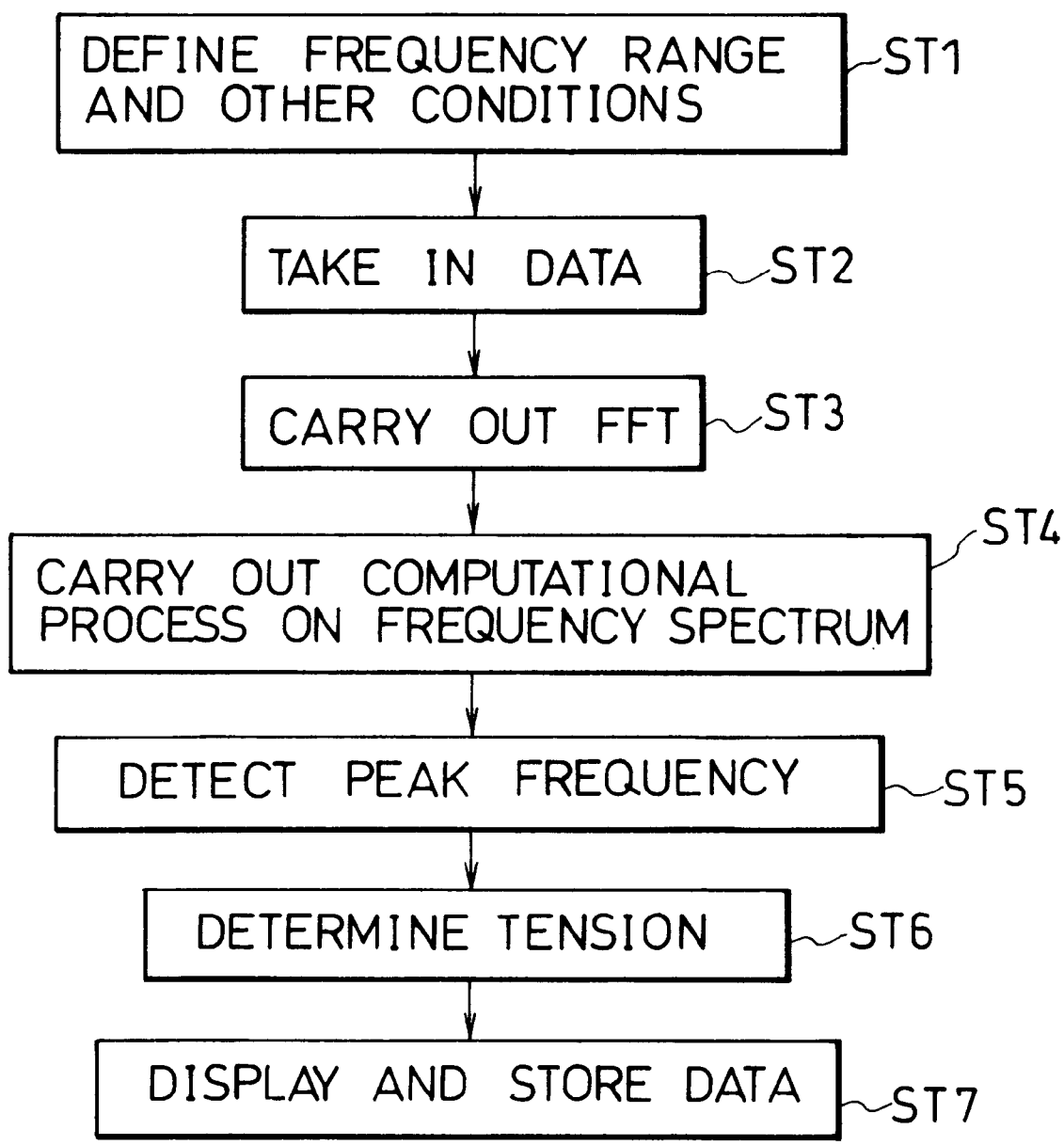
FIG. 2 is a flow chart of the operation of measuring tension of drawing an optical fiber by a method according to the invention.

FIG. 2 shows a flow chart of the operation of detecting the oscillation of an optical fiber by means of a noncontact type oscillation detector and determining the tension being applied to the optical fiber by means of a tensiometer on the basis of the data obtained by the detection that can be used with a method according to the invention. The operation includes Step ST1 through Step ST7. At Step ST1, a frequency range for detecting a peak frequency in a frequency spectrum is defined. At Step ST2, a standard sampling interval of 20 msec. is selected and data on the linear position of the optical fiber is collected for 20 seconds by the first and second noncontact type oscillation sensors 7 and 11 and the data collected in the 20 seconds is divided into four data groups in terms of time before they are stored in a memory device. At Step ST3, the data of each of the data groups are subjected to an FFT (fast Fourier transform) process to obtain Fourier components of discrete data At Step ST4, the data are averaged for each of the data groups in order to determine the averaged peak position in the frequency spectrum on the basis of the result of the FFT process. At Step ST5, a peak frequency is detected within the spectrum data obtained at the preceding step. At Step ST6, the actual value of the fundamental oscillation frequency f is determined from the peak frequency in the frequency spectrum detected at the previous step and used as substitute for f in equation $[T=(2 \cdot L \cdot f)^2 \cdot \rho \cdot \alpha]$ in order to determine the tension T being applied to the optical fiber. At Step ST7, the tension T being applied to the optical fiber that is obtained in the previous step is displayed and stored in a memory device.

The procedure for detecting a peak frequency in a frequency spectrum with a method according to the invention moves basically in a manner as described below. Firstly, an initial detecting operation is conducted over a frequency range expected to contain a peak frequency and then subsequent detecting operations are conducted over respective frequency ranges obtained by sequentially aligning the median frequency with the peak frequency detected in the immediately preceding detecting operation. As described earlier, with this arrangement, the frequency range over which the operation of detecting a peak frequency is conducted can be narrowed to eliminate the risk of mistaking a noise for a peak frequency and hence a peak frequency can be detected accurately, reliably and easily. According to the invention, the detection of a peak frequency in a frequency spectrum preferably comprises steps of preliminarily selecting an expected peak frequency (a), selecting a value (b) for a peak shift expected to take place in each peak frequency detecting operation, conducting an initial detecting operation over a frequency range defined by (a−b) and (a+b) and conducting subsequent detecting operations over respective frequency ranges defined by (c−b) and (c+b), c being the peak frequency detected in the immediately preceding detecting operation. With this arrangement, appropriate values are selected for a and b so teat the frequency range over which the operation of detecting a peak frequency is conducted can be defined in terms of a and b according to the circumstances to eliminate the risk of mistaking a noise for a peak frequency and hence a peak frequency can be detected accurately, reliably and easily. Preferably, the detection of a peak frequency in the frequency spectrum of a linear oscillation waveform is conducted between the upper limit and the lower limit of a preselected and fixed peak frequency range. Then the operation of detecting a peak frequency can never miss the mark and become astray after shifting the frequency range for detecting a peak frequency because a peak frequency exists between the upper limit and the lower limit for certain.

Figure 3:
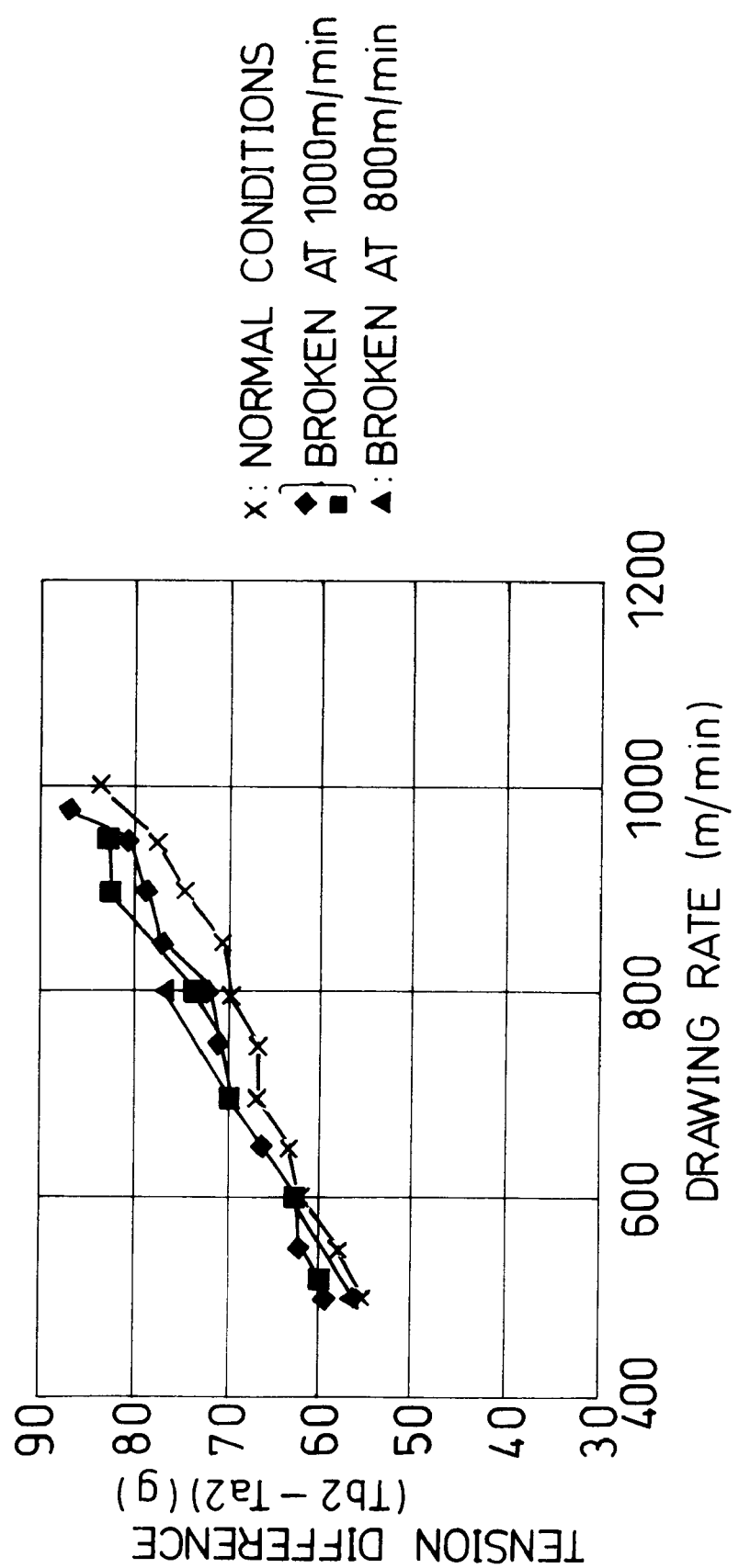
FIG. 3 is a graph illustrating the difference in the tension being applied to an optical fiber between the time when coated with a primary coat and the time when coated with a secondary coat as observed by a method according to the invention.
Figure 4:
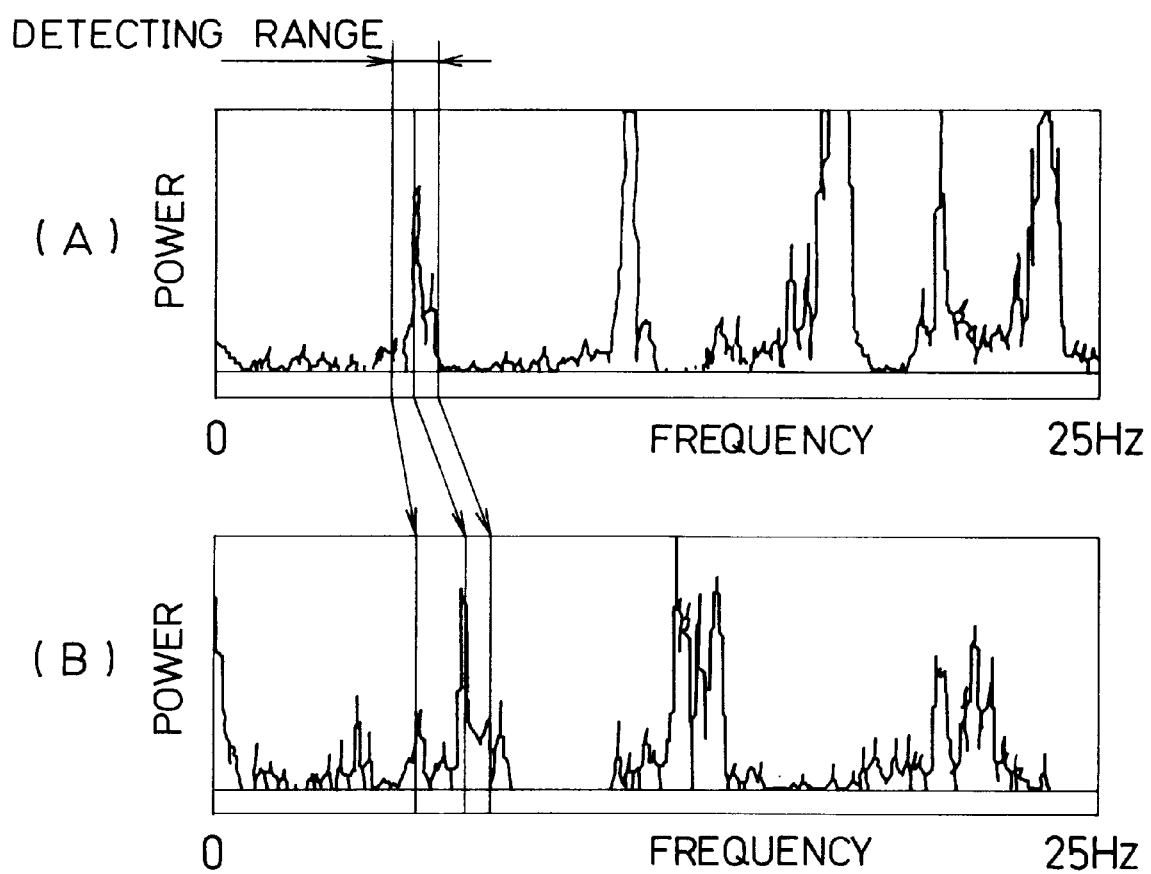
FIG. 4 is graphs showing two frequency spectrums obtained as result of an operation of detecting peak frequencies in the linear oscillation waveforms of optical fibers by a method according to the invention.

When an optical fiber 4a is coated with primary and secondary coats by means of an appropriate technique, the tension Ta2 can affect the optical fiber coated with a primary coat 4b and the tension Tb2 can affect the optical fiber coated with a secondary coat 4c. Therefore, according to the invention, the tension difference (Tb2–Ta2) is observed during the operation coating the optical fiber with primary and secondary coats. FIG. 3 shows a graph obtained as a result of such observation. It will he seen that the tension applied to an optical fiber is smaller when it is coated proper than when it is coated improperly. However, abnormal tension can take place to make a rapid coating operation impossible depending on the conditions under which the coating operation is performed. Such abnormal tension can eventually lead to a breakage of the optical fiber. Therefore, measures will be taken to correct the abnormal tension if such measures is necessary as a result of the monitoring operation as shown in FIG. 3. More specifically, if high tension is observed when the optical filer is being coated at a low rate, the temperature of the coating resin stored in the second coating die 16 will be lowered and/or the outer diameter of the primary coating being formed by the first coating die 9 will be reduced to reduce the tension.

Figure 5:
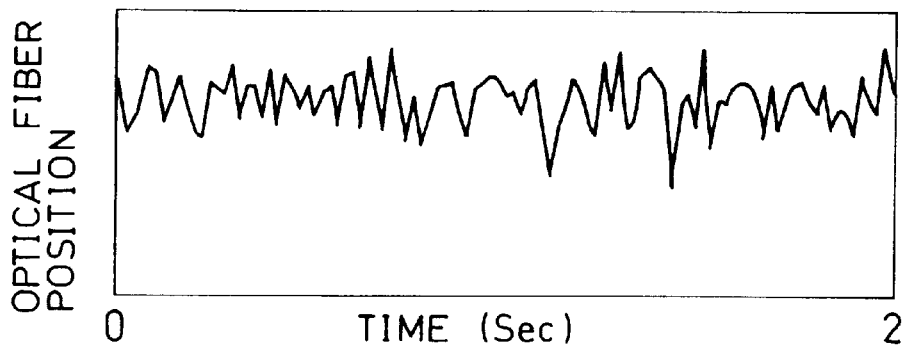
FIG. 5 is a graph showing the linear oscillation waveform of an optical fiber observed by a method according to the invention.
Figure 6:
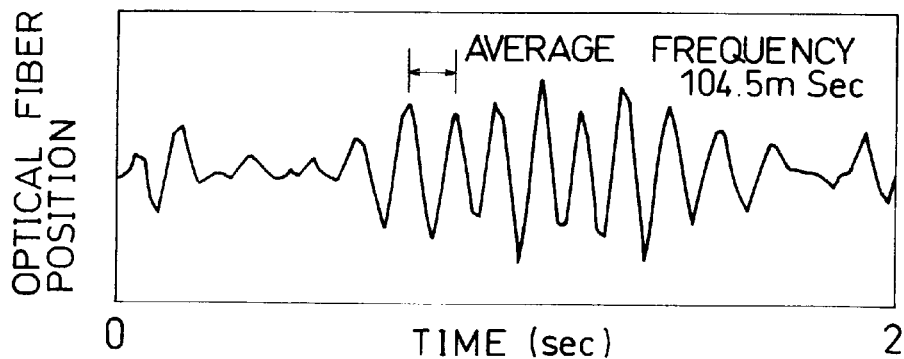
FIG. 6 is a graph showing the signal waveform obtained as a result of signal transformation using a bandpass filter to the linear waveform of FIG. 5 by a method according to the invention.

According to the invention, the linear oscillation waveform of the optical fiber may be made to pass through a bandpass filter corresponding to the detection frequency range and the obtained waveform may be transformed into a simple harmonic oscillation waveform data to detect the peak frequency of the spectrum from the obtained data This will be described specifically by referring to FIGS. 5 and 6. FIG. 5 is a graph showing the linear oscillation waveform of an optical fiber observed by a method according to the invention (with a sampling frequency of 50 HZ). For example, (a−b) and (a+b) may be used for the limits of the frequency range over which an operation of peak frequency detection is conducted and the linear oscillation waveform of FIG. 5 may be made to pass through a bandpass filter adapted to this frequency range. While the bandpass filter may be of either analog type or digital type, it may preferably be adapted to the conditions defined under FIG. 5 if it is of digital type. FIG. 6 is a graph showing the signal waveform obtained as a result of signal transformation using a bandpass filter to the linear waveform of FIG. 5 by a method according to the invention. As seen from FIG. 6, the data obtained by this signal transformation shows a waveform similar to that of simple harmonic oscillation. Therefore, the number of peaks and the number of times by which a certain level is exceeded within a predetermined period of time in the waveform can be counted from the data of FIG. 6 to determine the period (and the frequency) of the simple harmonic oscillation waveform in the above example, if an initial peak frequency detecting operation is conducted for a frequency range between (a−b) and (a+b), the frequency value (c) of the detected peak is used to as the median value for the frequency range defined by (c−b) and (c+b) for the succeeding peak frequency detecting operation. In this last peak frequency detecting operation, a bandpass filter may also be used for the linear oscillation waveform of the optical fiber to transform it into a simple harmonic oscillation waveform so that the data on the simple harmonic oscillation waveform may be used to determine the period (and the frequency) of the simple harmonic oscillation waveform. Then, the obtained oscillation frequency is used to determine the tension being applied to the optical fiber that is being drawn. The use of a bandpass filter allows to determine the oscillation frequency in a quick fashion. The various instrumental devices used herein may comprise personal computers and/or programmable controllers that can be designed in a relatively simple manner and provide simple computational means that will be reliable as Fourier transformation. The above described mode of carrying out the invention is particularly effective for continuously monitoring peak frequencies because it can be used on a real time basis.

With a method of measuring the tension of an optical fiber being drawn by determining the fundamental oscillation frequency of the optical fiber from a peak in the spectrum of the linear oscillation waveform of the optical fiber according to the invention, the frequency range over which the operation of detecting a peak frequency is conducted can be narrowed to eliminate the risk of mistaking a noise for a peak frequency and hence a peak frequency can be detected accurately, reliably and easily so that consequently the tension being applied to the optical fiber that is being drawn can be determined accurately and stably. Thus, a troubled situation where the optical fiber being drawn is broken and the produced optical fiber shows a large transmission loss can be effectively and reliably avoided.

What is claimed is:

1. A method of measuring tension of an optical fiber being drawn by determining a fundamental oscillation frequency of the optical fiber from a peak in a spectrum of a linear oscillation waveform of the optical fiber, characterized in that detection of a peak frequency in the frequency spectrum of a linear oscillation waveform comprises steps of conducting an initial detecting operation over a frequency range expected to contain a peak frequency and conducting subsequent detecting operations over respective frequency ranges obtained by sequentially detecting a median frequency using the peak frequency detected in an immediately preceding detecting operation.

2. A method of measuring tension of an optical fiber being drawn by determining the fundamental oscillation frequency of the optical fiber from a peak in a spectrum of a linear oscillation waveform of the optical fiber, characterized in that detection of a peak frequency in the frequency spectrum of a linear oscillation waveform comprises steps of preliminarily selecting an expected peak frequency (a), selecting a value (b) which represents a peak shift expected to take place in each peak frequency detecting operation, conducting an initial detecting operation over a frequency range defined by (a−b) and (a+b) and conducting subsequent detecting operations over respective frequency ranges defined by (c−b) and (c+b), c being the peak frequency detected in the immediately preceding detecting operation.

3. A method of measuring tension of an optical fiber being drawn according to claim 1, wherein the detection of a peak frequency in the frequency spectrum of a linear oscillation waveform is conducted between the upper limit and the lower limit of a preselected and fixed peak frequency range.

4. A method of measuring tension of an optical fiber being drawn according to claim 1, wherein the linear oscillation waveform of the optical fiber is made to pass through a bandpass filter corresponding to the detection frequency range and the obtained waveform is transformed into a simple harmonic oscillation waveform data to detect the peak frequency of the spectrum from the obtained data.

5. A method of measuring tension of an optical fiber being drawn according to claim 1, wherein the detection of a peak frequency in the frequency spectrum of a linear oscillation waveform further comprises a step of determining the value of the fundamental oscillation frequency f of the optical fiber from the peak frequency in the frequency spectrum of the observed oscillation waveform and using the determined value as substitute for f in equation $[T=(2 \cdot L \cdot f)^2 \cdot \rho \cdot \alpha]$, where T is the tension being applied to the optical fiber, L is the distance between the optical fiber source material and the coating die for forming a first coat layer on the drawn optical fiber or the distance between the first coating die for forming a first coat and the second coating die for forming a second coat layer, $\rho$ is the linear density and $\alpha$ is a correction factor.

* * * * *